US007620489B2

(12) United States Patent
Alessandri et al.

(10) Patent No.: US 7,620,489 B2
(45) Date of Patent: Nov. 17, 2009

(54) CONTROL METHOD FOR MIXTURE RATIO IN A MULTI-CYLINDER INTERNAL COMBUSTION ENGINE EQUIPPED WITH AT LEAST TWO LAMBDA SENSORS PLACED UPSTREAM OF A CATALYTIC CONVERTER

(75) Inventors: Andrea Alessandri, Bologna (IT); Fabio Sensi, Casalecchio di Reno (IT); Loris Lambertini, Crespellano (IT); Maurizio Fiorentini, Molinella (IT)

(73) Assignee: Magneti Marelli Powertrain S.p.A. (IT)

( * ) Notice: Subject to any disclaimer, the term of this patent is extended or adjusted under 35 U.S.C. 154(b) by 0 days.

(21) Appl. No.: 12/234,901

(22) Filed: Sep. 22, 2008

(65) Prior Publication Data

US 2009/0143956 A1 Jun. 4, 2009

(30) Foreign Application Priority Data

Sep. 26, 2007 (EP) .................................. 07425596

(51) Int. Cl.
*B60T 7/12* (2006.01)
*F02D 41/00* (2006.01)

(52) U.S. Cl. ....................... 701/103; 123/672; 123/692; 60/274

(58) Field of Classification Search ................. 701/103, 701/104, 114, 115; 123/434, 672, 674, 488, 123/690, 692; 60/274, 276, 285
See application file for complete search history.

(56) References Cited

U.S. PATENT DOCUMENTS

| | | | |
|---|---|---|---|
| 5,152,270 A | 10/1992 | Miyamoto | 123/692 |
| 5,213,088 A | 5/1993 | Harada | 123/674 |
| 5,511,377 A | 4/1996 | Kotwicki | 60/274 |
| 5,570,574 A * | 11/1996 | Yamashita et al. | 60/276 |

(Continued)

FOREIGN PATENT DOCUMENTS

| | | |
|---|---|---|
| JP | 63-5127 | 1/1988 |

OTHER PUBLICATIONS

International Search Report mailed Apr. 29, 2008 in corresponding European Application No. 07425596.9.

*Primary Examiner*—John T Kwon
(74) *Attorney, Agent, or Firm*—Ostrolenk Faber LLP

(57) ABSTRACT

Control method for the mixture ratio in a multi-cylinder internal combustion engine, the control method providing for the following: reading a first real value of the mixture ratio via a master lambda sensor associated with a first cylinder group, reading a second real value of the mixture ratio via a slave lambda sensor associated with a second cylinder group, calculating a first amount of fuel to inject into the cylinders of the first cylinder group to track a mixture ratio target value by using the first real value of the mixture ratio as a feedback variable, calculating the mean of the second real value of the mixture ratio in the detection window, calculating a correction value for the amount of fuel to inject based on the difference between a target value and the mean of the second real value of the mixture ratio, and calculating a second amount of fuel to inject into the cylinders of the second cylinder group by applying the correction value to the first amount of fuel to inject into the cylinders of the first cylinder group.

8 Claims, 2 Drawing Sheets

U.S. PATENT DOCUMENTS 5,715,678 A * 2/1998 Aronica et al. ................ 60/276
6,167,754 B1 * 1/2001 Koenders ................. 73/114.73
6,499,475 B2 * 12/2002 Vieser et al. ................ 123/692
6,651,490 B1 * 11/2003 Ceccarani et al. ........ 73/114.74

* cited by examiner

CONTROL METHOD FOR MIXTURE RATIO IN A MULTI-CYLINDER INTERNAL COMBUSTION ENGINE EQUIPPED WITH AT LEAST TWO LAMBDA SENSORS PLACED UPSTREAM OF A CATALYTIC CONVERTER

TECHNICAL FIELD

The present invention concerns a control method for the mixture ratio in a multi-cylinder internal combustion engine equipped with at least two lambda sensors placed upstream of a catalytic converter.

BACKGROUND ART

A multi-cylinder internal combustion engine comprises a number of cylinders, each of which cyclically burns a mixture that is composed of a comburent (fresh air taken in from the atmosphere) and a fuel (petrol, diesel fuel or similar) and which must have mixture ratio values (i.e. the ratio between comburent and fuel) equal to an intended value that is variable depending on the engine running condition and is generally close to the stoichiometric value necessary for the correct functioning of the catalytic converters in the exhaust system.

In order to optimize the conversion efficiency of the catalytic converter, it has been proposed to make the mixture ratio value (and therefore the oxygen content in the exhaust gas) oscillate around a mean value equal or close to the stoichiometric value by using a sinusoidal pulse having amplitude and frequency dependent on the physical characteristics and age of the actual catalytic converter.

Measurements of the oxygen content of the exhaust gas, which is provided by a lambda sensor positioned upstream of the catalytic converter, are used to control the mixture ratio.

When a single lambda sensor is placed upstream of the catalytic converter, the measurement provided by the single lambda sensor is used to control the mixture ratio of all the cylinders in the internal combustion engine. In particular, a single PID controller, which regulates the amount of fuel injected, is used to track an intended value for the mixture ratio, using the measurement provided by the single lambda sensor as a feedback variable.

When several lambda sensors are present, the cylinders of the lambda sensor equipped engine are divided into a number of groups (normally composed of one to three cylinders) and each lambda sensor is installed upstream of an exhaust manifold that merges the exhaust gas of all the cylinders in a manner such that the same lambda sensor measures the oxygen content of the exhaust gas of a respective group of cylinders; the mixture ratio of each group of cylinders is independently controlled from the mixture ratio of the other groups of cylinders by using the measurement provided by the respective lambda sensor. In particular, a PID controller is used for each respective group of cylinders, which regulates the amount of fuel injected into the group of cylinders to track an intended value for the mixture ratio by using the measurement provided by the respective lambda sensor as a feedback variable.

The above-described way of controlling the mixture ratio presents some drawbacks when several lambda sensors are present, as it is difficult to achieve the intended oscillation in the mixture ratio of the exhaust gas fed to the catalytic converter as the mixture ratio controls of the various groups of cylinders are mutually independent. In other words, each mixture ratio control tries to achieve the intended oscillation in the exhaust gas mixture ratio, but the oscillations caused by the various mixture ratio controls might not be perfectly timed due the inevitable presence of small asymmetries and therefore the overall oscillation (constituted by the sum of the oscillations caused by the various mixture ratio controls) that affects the catalytic converter might be very different from the intended oscillation, both in terms of amplitude and frequency.

DISCLOSURE OF INVENTION

The object of the present invention is to provide a control method for the mixture ratio in a multi-cylinder internal combustion engine equipped with at least two lambda sensors placed upstream of a catalytic converter, this control method being both devoid of the above-described drawbacks and, in particular, of straightforward and economic embodiment.

According to the present invention, a control method is provided for the mixture ratio in a multi-cylinder internal combustion engine equipped with at least two lambda sensors placed upstream of a catalytic converter, in accordance with that recited by the attached claims.

BRIEF DESCRIPTION OF THE DRAWINGS

The present invention shall now be described with reference to the enclosed drawings, which show two non-limitative embodiments, where.

PREFERRED EMBODIMENTS OF THE INVENTION

Figure 1:
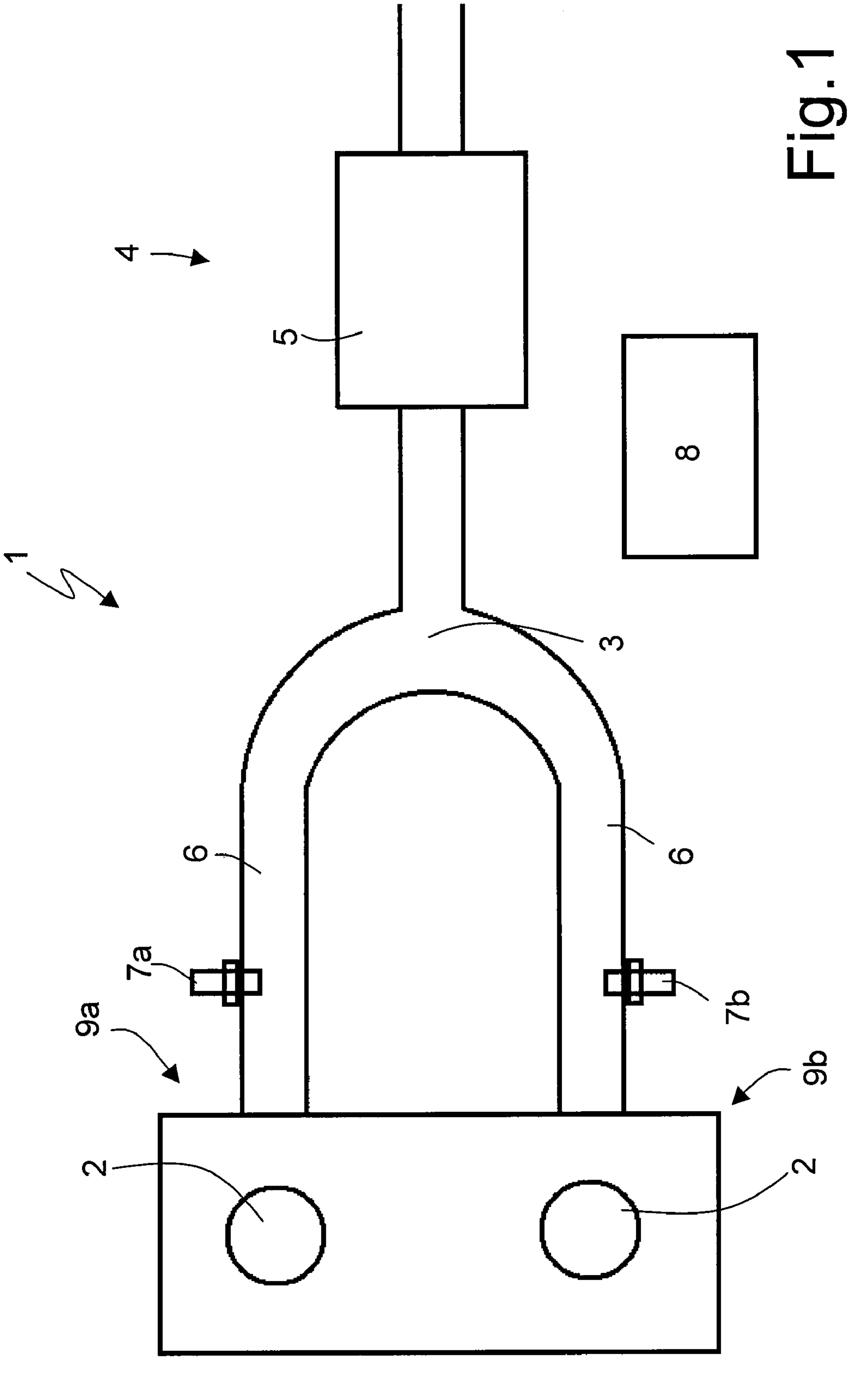
FIG. 1 is a schematic view of an internal combustion engine that operates according to the control method forming the subject of the present invention.

In FIG. 1, reference numeral 1 indicates, in its entirety, an internal combustion engine comprising two cylinders 2, each of which is connected to an intake manifold (not shown) via at least one respective intake valve (not shown) and to an exhaust manifold 3 via at least one respective exhaust valve (not shown). An exhaust system 4, which emits the gases produced by combustion into the atmosphere and comprises a catalytic converter 5 and at least one silencer (not shown) placed downstream of the catalytic converter 5, is connected to the exhaust manifold 3.

Each cylinder 2 is connected to the exhaust manifold 3 via an exhaust pipe 6, which runs from the cylinder 2 and terminates on the exhaust manifold 3; a lambda sensor 7, which can provide an on/off type binary output to indicate whether the exhaust gas mixture ratio is above or below the stoichiometric value, or can provide a linear output that indicates the oxygen content in the exhaust gas, is connected to each exhaust pipe 6.

Each cylinder 2 receives fresh air (i.e. air arriving from the atmosphere) through the intake manifold (not shown) and receives fuel from a fuel injection system (not shown), which can be of the indirect or direct type. The fresh air and fuel mix with each other to form a mixture that is burnt inside each cylinder 2 to generate the torque that causes rotation of a drive shaft (not shown) of the internal combustion engine 1. The internal combustion engine 1 comprises an electronic control unit 8 that pilots the fuel injection system so that the mixture ratio burnt in the cylinders 2 is equal to an intended value that varies as a function of the engine running condition and is generally close to the stoichiometric value necessary for correct functioning of the catalytic converter 6.

The control procedure used by the electronic control unit 8 to control the mixture ratio burnt in the cylinders 2, or rather to determine the amount of fuel to inject into the cylinders 2, will now be described.

To control the mixture ratio burnt in the cylinders 2, the electronic control unit 8 divides the two cylinders 2 into two groups 9 of cylinders, each of which is associated with a respective lambda sensor 7. In other words, the cylinder 2 of cylinder group 9*a* discharges exhaust gas into the exhaust pipe 6 equipped with respective lambda sensor 7*a*, while the cylinder 2 of cylinder group 9*b* discharges exhaust gas into the exhaust pipe 6 equipped with respective lambda sensor 7*b*. In this way, each lambda sensor 7 detects the composition of the exhaust gas discharged by the cylinders 2 of the respective cylinder group 9. Furthermore, the electronic control unit 8 considers lambda sensor 7*a* as the main or "master" one and considers lambda sensor 7*b* as the secondary or "slave" one, such that control of the mixture ratio burnt in the cylinders 2 is carried out using the signal of the master lambda sensor 7*a*, while the signal of the slave lambda sensor 7*b* is only used to make a correction for the cylinder group 9*b* associated with the slave lambda sensor 7*b*. The fact of considering lambda sensor 7*a* as the master and considering lambda sensor 7*b* as the slave is only a convention established in the design phase and could be inverted without problem (i.e. by considering lambda sensor 7*a* as the slave and lambda sensor 7*b* as the master).

The electronic control unit 8 establishes a mixture ratio target value, which is normally close to the stoichiometric value and is generally variable with the engine running condition (for example, in the case of a cold engine, a richer mixture ratio is maintained). The electronic control unit 8 then reads a first real value of mixture ratio via the master lambda sensor 7*a* associated with the first cylinder group 9*a* and calculates a first amount of fuel to inject into the cylinders 2 of the first cylinder group 9*a* to track the mixture ratio target value, using the first real value of the mixture ratio provided by the master lambda sensor 7*a* as a feedback variable. For example, the electronic control unit 8 uses a PID controller to define the amount of fuel injected into the cylinders 2 of cylinder group 9*a* to track the mixture ratio target value by using the first real value of the mixture ratio provided by the master lambda sensor 7*a* as a feedback variable.

In addition, the electronic control unit 8 reads a second real value of the mixture ratio via the slave lambda sensor 7*b* associated with the cylinder group 9*b*, calculates a target value for the mean of the second real value of the mixture ratio in a detection window, calculates the mean of the second real value of the mixture ratio in the detection window, calculates a correction value for the amount of fuel to inject in function of the difference between the mean target value and the mean of the second real value of the mixture ratio, and calculates a second amount of fuel to inject into the cylinders 2 of the second cylinder group 9*b* applying the correction value to the first amount of fuel to inject into the cylinders 2 of the first cylinder group 9*a*. For example, to determine the second amount of fuel to inject into the cylinders 2 of the second cylinder group 9*b*, the correction value is algebraically added to (or multiplied by) the first amount of fuel to inject into the cylinders 2 of the first cylinder group 9*a*.

It is important to underline that the second amount of fuel to inject into the cylinders 2 of the second cylinder group 9*b* is obtained directly from the first amount of fuel to inject into the cylinders 2 of the first cylinder group 9*a*, from which it differs only by the correction value. In consequence, the second amount of fuel to inject into the cylinders 2 of the second cylinder group 9*b* is perfectly in phase with the first amount of fuel to inject into the cylinders 2 of the first cylinder group 9*a*. It is therefore possible to easily and accurately obtain an oscillation in the mixture ratio of the exhaust gas fed to the catalytic converter 5 because if the second amount of fuel to inject into the cylinders 2 of the second cylinder group 9*b* is perfectly in phase with the first amount of fuel to inject into the cylinders 2 of the first cylinder group 9*a*, then the mixture ratio of the exhaust gas discharged by the cylinders 2 of the second cylinder group 9*b* is also perfectly in phase with the mixture ratio of the exhaust gas discharged by the cylinders 2 of the first cylinder group 9*a*.

According to a preferred embodiment, the electronic control unit 8 calculates the mean of the first real value of the mixture ratio in the detection window and then calculates the target value for the mean of the second real value of the mixture ratio based on the mean of the first real value of the mixture ratio and/or based on the mixture ratio target value. It is important to underline that the target value for the mean of the second real value of the mixture ratio can be identical or even (slightly) different from the mean of the first real value of the mixture ratio; for example, the target value for the mean of the second real value of the mixture ratio could be used to correct an undesired variance between the mean of the first real value of the mixture ratio and the mixture ratio target value.

The detection window can be defined on a time basis (i.e. it can be measured in seconds and therefore have a constant time duration), or be defined on the basis of the number of commutations performed by the master lambda sensor 7*a* (i.e. it can be measured in a number commutations and therefore have a variable time duration).

According to a possible embodiment, the electronic control unit 8 carries out historical analysis on the correction value, calculates a historic correction value based on the outcome of the historical analysis on the correction value, and applies the historic correction value by default to determine the second amount of fuel to inject into the cylinders 2 of the second cylinder group 9*b*, by applying the historic correction value to the first amount of fuel to inject into the cylinders 2 of the first cylinder group 9*a*. In other words, the electronic control unit 8 initially uses the historic correction value that, if necessary, is subsequently modified based on the difference between the mean target value and the mean of the second real value of the mixture ratio.

Figure 2:
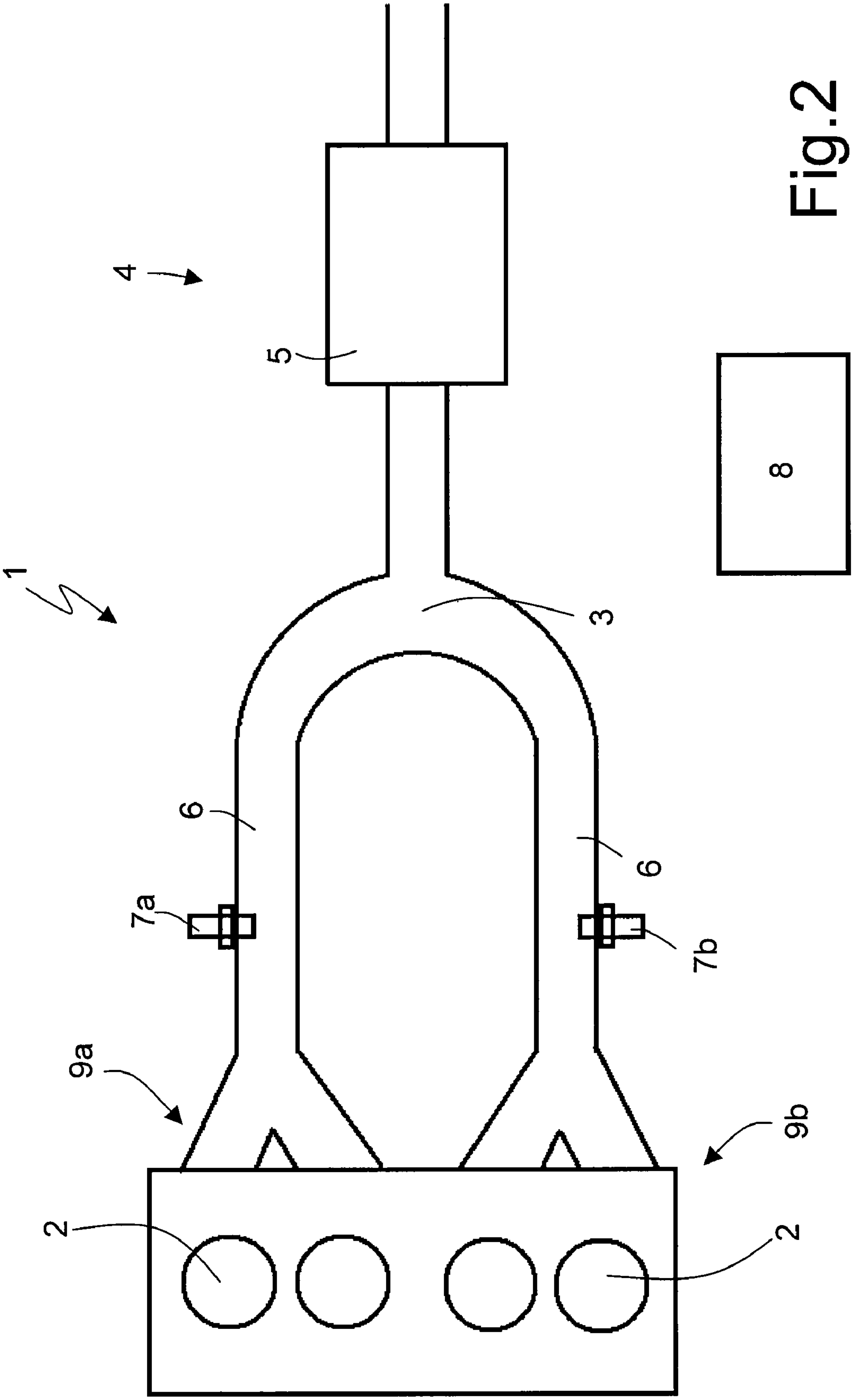
FIG. 2 is a schematic view of another internal combustion engine that operates according to the control method forming the subject of the present invention.

FIG. 2 shows a different internal combustion engine 1, which is totally similar to the above-described internal combustion engine 1 shown in FIG. 1, except for the fact that it comprises four cylinders 2 divided into two cylinder groups 9, each having two cylinders 2.

Obviously, the above-described control method can be applied to any multi-cylinder internal combustion engine equipped with at least two lambda sensors placed upstream of a common catalytic converter. For example, the internal combustion engine could comprise six cylinders divided into three groups of cylinders coupled to three lambda sensors; in this case, one lambda sensor is the master, while the other two lambda sensors are slaves. Alternatively, the internal combustion engine could comprise four cylinders divided into four groups of cylinders coupled to four lambda sensors; in this case, one lambda sensor is master and the other three lambda sensors are slaves.

The above-described control method for the mixture ratio has the advantage that the second amount of fuel to inject into the cylinders 2 of the second cylinder group 9*b* is perfectly in phase with the first amount of fuel to inject into the cylinders 2 of the first cylinder group 9*a* and therefore the mixture ratio of the exhaust gas discharged by the cylinders 2 of the second cylinder group 9*b* is also perfectly in phase with the mixture ratio of the exhaust gas discharged by the cylinders 2 of the first cylinder group 9*a*. In this way, it is possible to easily and accurately obtain an oscillation in the mixture ratio of the exhaust gas fed to the catalytic converter 5. Moreover, the above-described control method for the mixture ratio is of economic and straightforward embodiment in a modern internal combustion engine, as it does not require the installation of any additional component with respect to what is normally already present and, above all, calls for the use of a sole PID controller independently of the number of cylinder groups (i.e. the number of lambda sensors), instead of a PID controller for each cylinder group (i.e. for each lambda sensor) as required in a traditional control.

The invention claimed is:

1. Control method for the mixture ratio in a multi-cylinder internal combustion engine (1) equipped with at least two lambda sensors (7) placed upstream of a common catalytic converter (5) and at least two groups (9) of cylinders, each of which is associated with a respective lambda sensor (7), the control method comprising the steps of:

establishing a mixture ratio target value;

reading a first real value of the mixture ratio via a master lambda sensor (7*a*) associated with a first cylinder group (9*a*);

reading a second real value of the mixture ratio via a slave lambda sensor (7*b*) associated with a second cylinder group (9*b*); and calculating a first amount of fuel to inject into the cylinders (2) of the first cylinder group (9*a*) to track the mixture ratio target value, using the first real value of the mixture ratio provided by the master lambda sensor (7*a*) as a feedback variable;

the control method is characterized in that it comprises the additional steps of:

calculating a target value for the mean of the second real value of the mixture ratio in a detection window;

calculating the mean of the second real value of the mixture ratio in the detection window;

calculating a correction value for the amount of fuel to inject in function of the difference between the mean target value and the mean of the second real value of the mixture ratio; and calculating a second amount of fuel to inject into the cylinders (2) of the second cylinder group (9*b*) by applying the correction value to the first amount of fuel to inject into the cylinders (2) of the first cylinder group (9*a*).

2. Control method according to claim 1, wherein the correction value is algebraically added to the first amount of fuel to inject into the cylinders (2) of the first cylinder group (9*a*) in order to determine the second amount of fuel to inject into the cylinders (2) of the second cylinder group (9*b*).

3. Control method according to claim 1, wherein the correction value is multiplied by the first amount of fuel to inject into the cylinders (2) of the first cylinder group (9*a*) in order to determine the second amount of fuel to inject into the cylinders (2) of the second cylinder group (9*b*).

4. Control method according to claim 1, wherein the step of calculating the target value for the mean of the second real value of the mixture ratio in the detection window provides for the additional steps of:

calculating the mean of the first real value of the mixture ratio in the detection window, and calculating the target value for the mean of the second real value of the mixture ratio as a function of the mean of the first real value of the mixture ratio.

5. Control method according to claim 1, wherein the target value for the mean of the second real value of the mixture ratio is calculated as a function of the mixture ratio target value.

6. Control method according to claim 1, wherein the detection window is defined on a time basis.

7. Control method according to claim 1, wherein the detection window is defined on the basis of the number of commutation performed by the master lambda sensor (7*a*).

8. Control method according to claim 1 and comprising the additional steps of:

carrying out historical analysis on the correction value;

calculating a historic correction value based on the outcome of the historical analysis on the correction value; and applying the historic correction value by default to determine the second amount of fuel to inject into the cylinders (2) of the second cylinder group (9*b*), by applying the historic correction value to the first amount of fuel to inject into the cylinders (2) of the first cylinder group (9*a*).

* * * * *